Aug. 29, 1967 S. R. BHOLA 3,338,209

EPITAXIAL DEPOSITION APPARATUS

Filed Oct. 23, 1965

INVENTOR.
SIRI RAM BHOLA
BY
John H. Gallagher
ATTORNEY

United States Patent Office 3,338,209

Patented Aug. 29, 1967

3,338,209

EPITAXIAL DEPOSITION APPARATUS

Siri Ram Bhola, St. Louis, Mo., assignor to Sperry Rand Corporation, a corporation of Delaware Filed Oct. 23, 1965, Ser. No. 503,044
7 Claims. (Cl. 118—49.5)

The invention relates to a reactor tube that is used in the epitaxial deposition process of forming thin films of semiconductor material on a substrate material, and more particularly the invention relates to a novel design of a reactor tube which produces a gas and vapor flow that is characterized by a relatively flat velocity profile of the gas and vapor through the tube, thereby assuring more uniform deposition of semiconductor material onto the substrate.

The epitaxial deposition process as applied to the manufacture of electronic semiconductor devices involves the deposition of a material in the vapor phase onto a monocrystalline substrate to form a monocrystalline layer whose orientation is determined by that of the substrate. One popular epitaxial deposition process for forming, or growing, thin layers of silicon on a silicon wafer substrate utilizes the reduction by hydrogen of silicon tetrachloride. Briefly outlined, this particular method involves the use of a graphite supporting member, called a susceptor, upon which substrates in the form of silicon wafers are placed. The susceptor is placed within an elongated quartz tube called a reactor tube and the silicon tetrachloride in the vapor phase is carried by pure hydrogen gas over the wafers. The susceptor, and in turn the wafers, are heated by induction heating to a sufficiently high temperature to produce a reaction of the gas and vapor to form hydrogen chloride (HCl) and silicon which epitaxially deposits on the wafer. For a more complete description of this and other epitaxial deposition processes, reference is made to the December 1963 issue of RCA Review which contains a number of articles relating to this subject and in which the use of various substrates, gases and vapors are discussed.

In an arrangement of commonly used apparatus two parallel rows of wafers are positioned on the susceptor so that the rows lie on opposite sides of the central axis of the reactor tube. The reactor tube that commonly is used is a hollow cylindrically shaped member of quartz which abruptly terminates at its two ends at much smaller input and exhaust tubes which permit the hydrogen and silicon tetrachloride vapor (hereafter referred to as reactant) to pass through the tube and thus come into contact with the heated wafers.

In order to produce good and acceptable semiconductor devices with a high degree of consistency, that is, high reproducibility, the epitaxial layers must be uniformly deposited on each wafer and the thicknesses of the layers on all of the wafers must be substantially the same, regardless of the position of the wafer within the reactor tube. In the past, the yield of good semiconductor devices has been less than desired becaused neither of the above-named features has been obtainable with any degree of assurance. By inclining the susceptor so that the downstream end is higher than the upstream end, and by assuring that the susceptor is substantially uniformly heated throughout the region occupied by the wafers, the uniformity of the epitaxially deposited layers from wafer to wafer has been improved. However, the thickness of the deposited layers still was non-uniform on the individual wafers, it having been found that the portions of the wafers adjacent to the central axis of the reactor tube had a thicker layer of deposited material than the outer portions that are farthest removed from the central axis.

I have determined that the non-uniformity of the deposited layer is a consequence of the nature of the flow of the gaseous reactant through the reactor tube, and the characteristics of this flow are in turn determined by the shape of the reactor tube at its input end where the reactant enters the tube. In the prior art tube wherein the cylindrically shaped reactor tube abruptly terminated in a much smaller input tube, the gaseous reactant flowed from the input tube into the much larger reactor tube in the form of a jet in which the velocity of the reactant was greatest in the region along the central axis of the tube and least in the region adjacent the walls of the reactor tube. This resulted in the existence of a velocity gradient transversely across the portions of the tube occupied by the wafers, with the result that a greater quantity of reactant passed over the portions of the wafers closest the central axis where the velocity was highest, and consequently a greater quantity of material was deposited on the more centrally located portions of the wafers.

It therefore is an object of this invention to provide a reactor tube for use in a deposition process which produces a more uniform velocity distribution characteristic of the flowing gaseous reactant material thereby to produce a more uniform deposition of said material on substrate material to be coated.

In accordance with the present invention more uniform coatings are deposited on the wafer substrates by the use of a reactor tube whose input end is stepped in a succession of increasingly larger diameters from the small diameter of the input opening to the much larger diameter of the cylindrical body of the tube. The successive steps form a transistion section which has the effect of eliminating the jet-like characteristic of the entering gaseous reactant and produces a relatively flatter velocity profile of the entering reactant, whereby the quantity of reactant that flows over each of the wafers is more uniform in the direction transverse to the direction of flow.

The present invention will be described by referring to the accompanying drawings wherein.

Figure 1:
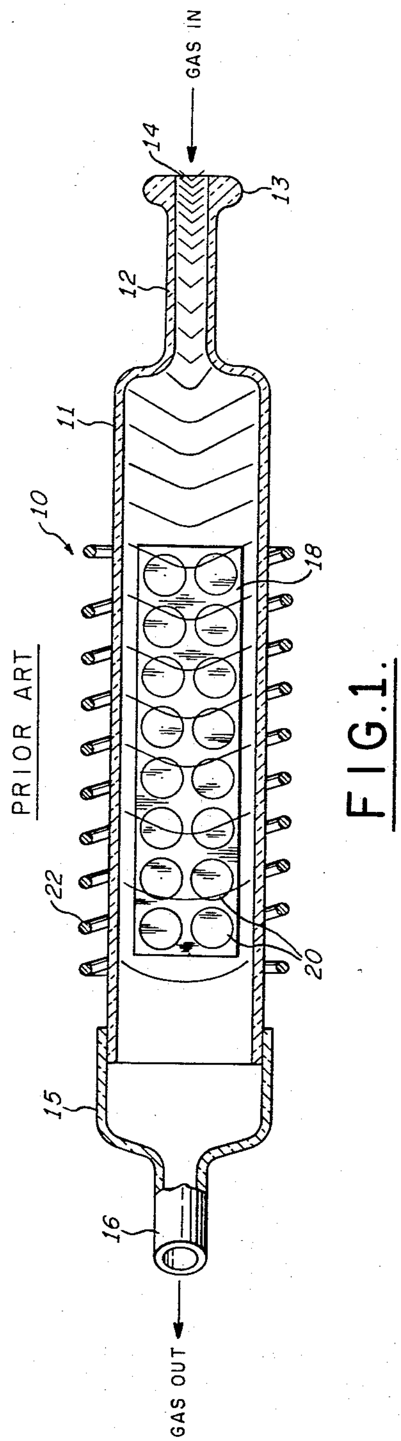
FIG. 1 is a sketch illustrating a prior art reactor tube that commonly was used in the epitaxial deposition process of manufacturing semiconductor devices and is used to point out the deficiencies that accompanied the use of that type of reactor tube.

Referring now in detail to the drawings,

FIG. 1 illustrates a prior art reactor tube as used in the epitaxial deposition process of forming thin films of semiconductor material on a substrate material. The reactor tube 10 is illustrated as being comprised of a main hollow cylindrical body portion 11 which is open at its left end and which abruptly terminates at its right end into the much smaller input tube portion 12. A ball joint 13 is provided at the input opening 14 to facilitate making a secure connection to a source of gaseous reactant materials, such as a hydrogen carrier gas and silicon tetrachloride vapor which are commonly used. The left end of reactor tube 10 is releasably secured to a standard joint member 15 which includes the much smaller diameter exhaust tube 16. A susceptor 18 is positioned within the cylindrical body portion 11 of reactor tube 10 prior to the securing of the joint member 15 to the left end of reactor tube 10. Two parallel rows of substrate members 20 are positioned on susceptor 18. In practice, the substrate members may be wafers of silicon material which are to be formed into transistors, diodes, or other types of semiconductor devices.

Susceptor 18 may be of a graphite or silicon material and it may be inductively heated by an R.F. magnetic field that is established by the R.F. coil 22 that is coaxially disposed about the portion of reactor tube 10 that is occupied by the susceptor 18. Inasmuch as the epitaxial process per se forms no part of the present invention it will not be described in detail, but reference again is made to the above-cited publication.

The gaseous reactant enters the input opening 14 of the reactor tube 10 under pressure that is established by the reactant source. The angularly shaped figures that appear throughout the input tube portion 12 are intended to represent the velocity profiles of the entering gaseous reactant, As illustrated, the velocity profiles are quite sharp in the input tube 12 and at the entrance to the larger cylindrically shaped body portion 11 of reactor tube 10, thus indicating that the reactant enters this larger body portion 11 with a jet-like characteristic. As further illustrated, this jet-like characteristic continues throughout the larger portion of the reactor tube, including that portion occupied by a majority of the wafers 20. Because of the jet-like nature of the velocity profile of the entering reactant, a velocity gradient will exist across the portion of reactor tube 10 in which the wafers 20 are positioned, and a greater quantity of reactant will flow along the central axis of reactor tube 10 than will flow along the boundary region of the reactor tube. As a consequence of the reactant flowing with the velocity profiles illustrated in FIG. 1, the epitaxially deposited layer of semiconductor material will be thicker on those portions of the wafer that are nearer to the central axis of the reactor tube. This non-uniformity of deposited material across the wafers is undesirable and often leads to inferior semiconductor devices.

Figure 2:
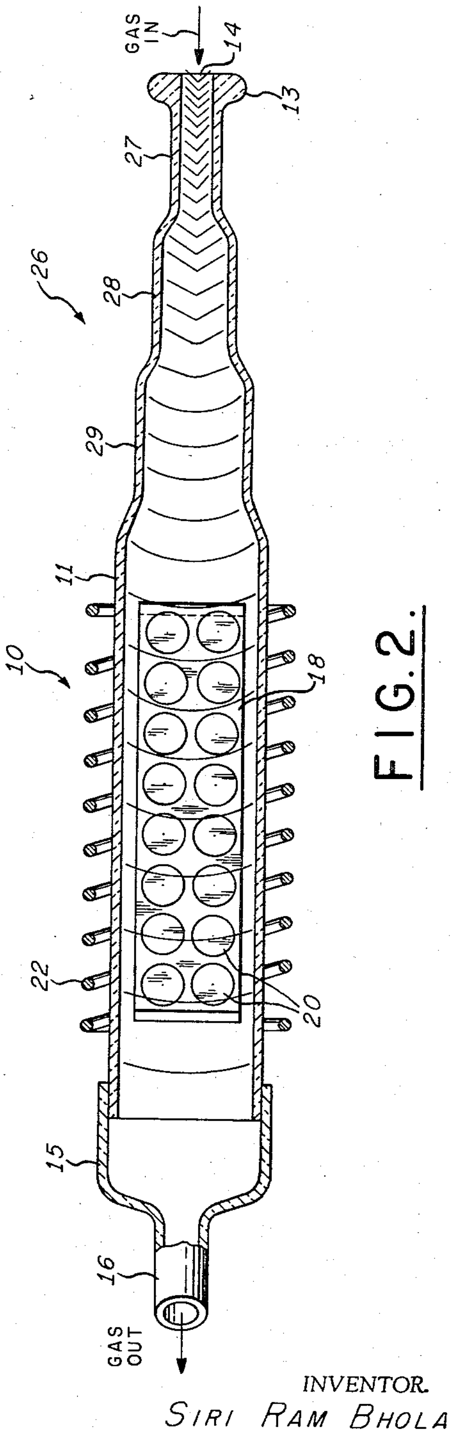
FIG. 2 is a sketch that illustrates the use of a reactor tube constructed in accordance with the present invention.

The problem resulting from the use of a reactor tube of the type illustrated in FIG. 1 is overcome by the use of a reactor tube of the type illustrated in FIG. 2. In this reactor tube the input end is comprised of a transition section 26 that includes a succession of transitions 27, 28 and 29 of increasingly larger diameters. The effect that the successively increasing diameter of the transition section 26 has upon the velocity profiles of the entering reactant is clearly illustrated in FIG. 2. As may be seen, the velocity profiles become flatter and flatter as the reactant progresses through the transition section 26 and into the main body portion 11 of the reactor tube 10. In the region of the reactor tube 10 that is occupied by the wafers 20 the velocity profiles of the flowing reactant are but slightly curved so that substantially the same quantity of reactant flows across all parts of each wafer, thereby assuring a much more uniform deposit of material on the wafer surface.

In one embodiment of the reactor tube of this invention the tube was constructed of quartz and the main body portion 11 and the transitions 29, 28 and 27 of transition section 26 were cylindrical in shape and had approximately the following respective lengths and diameters, which are expressed in inches: 30 x 3.75; 6 x 3.15; 5.5 x 1.18; 4.5 x 4.75. It will be seen that the length of each transition is greater than its diameter and that the entire transition section 26 is considerably longer than the diameter of the main body portion 11 of the tube. This proportioning of dimensions produced the relatively flat velocity profiles which are illustrated in simplified form in FIG. 2.

In the practice of the epitaxial deposition process using a reactor tube of the type illustrated in FIG. 2, I have found that the uniformity of the deposited layers of semiconductor material is significantly improved and the yield of acceptable semiconductor devices likewise has been improved. It will be appreciated by those skilled in the art that the taper from the smaller diameter input opening 14 to the larger diameter body portion 11 of reactor tube 10 need not necessarily be accomplished by discrete steps in the diameter of the transition section 26. Alternatively, the transition section 26 may be of uniformly increasing diameter throughout its length so as to make a smooth flare or taper into the main body portion 11 of the reactor tube 10.

Furthermore, it is not absolutely necessary that the transition section 26 be part of the reactor tube 10 itself. Alternatively, the transition section 26 may be manufactured as a separate item which would serve as a joint which could be slipped into secure engagement with the open end of a standard reactor tube of the type illustrated in FIG. 1, in which case the direction of flow through the reactant tube would be reversed from that illustrated in FIG. 1 since the left end of the tube then would be connected to the input transition section. It further will be appreciated that the reactor tube of this invention is not restricted to use in the epitaxial deposition process, but it also is useful in the vapor diffusion process of forming semiconductor devices.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for use in depositing a first material onto a substrate material comprising,
- an elongated hollow member adapted to receive said substrate material and through which a gas may pass,
- means for causing said gas to pass through said elongated hollow member with a relatively flat velocity profile, said means comprising,
- a hollow transition section aligned with said elongated hollow member and having an output opening at one end whose transverse cross sectional area is substantially the same as that of the elongated hollow member and having an input opening at its opposite end whose cross sectional area is less than that of the elongated hollow member,
- the inner cross sectional area of said transition section increasing in stepwise manner throughout its length from that of the input opening to that of the output opening which joins said elongated hollow member,
- said transition section having a length greater than its maximum transverse dimension.

2. Apparatus for use in the deposition of a first material onto a substrate material comprising,
- an elongated hollow member adapted to receive said substrate material and through which said first material and through which said first material may be passed,
- an input opening for introducing said first material into the region of said elongated hollow member that is to be occupied by said substrate material,
- said input opening having a smaller inner transverse dimension than that of said elongated hollow member, and
- a transition member disposed between said input opening and said elongated hollow member and having an inner transverse dimension which increases in stepwise manner from that of said input opening to that of said elongated hollow member,
- said transition member having a length that is greater than the increase in the inner transverse dimension that is accomplished throughout its length.

3. The combination claimed in claim 2 wherein said elongated hollow member, said transition section and said input opening are disposed along a central axis that passes coaxially through said elongated hollow member.

4. A reactor tube of a material suitable for use in depositing a first material onto a substrate material comprising,
- a hollow cylindrically shaped body portion,
- a hollow transition section aligned with and joined to said body portion, said transition section having an input opening at its end farthest removed from the body portion which has a diameter smaller than that of the body portion, said transition section having an inner diameter that increases in stepwise manner throughout its length from that of the input opening to that of the body portion, and said increase in diameter being less than the length of said transition section.

5. The combination claimed in claim 4 wherein said transition section is comprised of a plurality of tubular sections of successively larger diameters.

6. The combination claimed in claim 5 wherein each of said tubular sections has a length greater than its inner diameter.

7. The combination claimed in claim 5 wherein the length of said transition section is greater than the transverse dimension of said cylindrically shaped body portion.

References Cited

UNITED STATES PATENTS 3,293,074 12/1966 Nick -------------- 118—49.5

MORRIS KAPLAN, *Primary Examiner.*